(12) United States Patent
Delferro et al.

(10) Patent No.: US 11,780,985 B2
(45) Date of Patent: Oct. 10, 2023

(54) CATALYTIC UPCYCLING OF POLYMERS

(71) Applicant: UCHICAGO ARGONNE, LLC, Chicago, IL (US)

(72) Inventors: Massimiliano Delferro, Chicago, IL (US); Magali S. Ferrandon, Steger, IL (US); Robert M. Kennedy, Lemont, IL (US); Gokhan Celik, Lemont, IL (US); Ryan Hackler, Lemont, IL (US); Kenneth Poeppelmeier, Evanston, IL (US); Aaron D. Sadow, Ames, IA (US)

(73) Assignee: UChicago Argonne, LLC, Chicago, IL (US)

( * ) Notice: Subject to any disclaimer, the term of this patent is extended or adjusted under 35 U.S.C. 154(b) by 253 days.

(21) Appl. No.: 17/000,969

(22) Filed: Aug. 24, 2020

(65) Prior Publication Data
US 2021/0061971 A1 Mar. 4, 2021

Related U.S. Application Data

(60) Provisional application No. 62/892,347, filed on Aug. 27, 2019.

(51) Int. Cl.
| | | |
|---|---|---|
| *C08J 11/10* | (2006.01) | |
| *B01J 35/02* | (2006.01) | |
| *C08F 8/50* | (2006.01) | |
| *B01J 23/42* | (2006.01) | |
| *B82Y 40/00* | (2011.01) | |
| *B82Y 30/00* | (2011.01) | |

(52) U.S. Cl.
CPC ............... *C08J 11/10* (2013.01); *B01J 23/42* (2013.01); *B01J 35/023* (2013.01); *C08F 8/50* (2013.01); *B82Y 30/00* (2013.01); *B82Y 40/00* (2013.01)

(58) Field of Classification Search
CPC ........ B01J 23/42; B01J 35/023; B01J 23/002; B01J 23/58; B01J 23/8946; B01J 23/63; B01J 2523/24; B01J 2523/47
See application file for complete search history.

(56) References Cited

U.S. PATENT DOCUMENTS

| | | | |
|---|---|---|---|
| 2005/0285421 A1 | 12/2005 | Novakovich et al. | |
| 2007/0249497 A1* | 10/2007 | Tanaka ................ | B01J 23/8946 502/327 |
| 2011/0172088 A1 | 7/2011 | Bedard et al. | |

(Continued)

FOREIGN PATENT DOCUMENTS

| | | |
|---|---|---|
| JP | 2003-321682 A | 11/2003 |
| JP | 4154929 B2 | 9/2008 |

(Continued)

OTHER PUBLICATIONS

Qureshi et al., catalytic consequences of ultrafine Pt clusters supported on SrTiO3 for photocatalytic overall water splitting, (Journal of Catalysis 376 (2019)180-190).*

(Continued)

*Primary Examiner* — Jafar F Parsa
(74) *Attorney, Agent, or Firm* — Foley & Lardner LLP

(57) ABSTRACT

A method of upcycling polymers to useful hydrocarbon materials. A catalyst with nanoparticles on a substrate selectively docks and cleaves longer hydrocarbon chains over shorter hydrocarbon chains. The nanoparticles exhibit an edge to facet ratio to provide for more interactions with the facets.

7 Claims, 9 Drawing Sheets

(56) References Cited

U.S. PATENT DOCUMENTS

| | | | |
|---|---|---|---|
| 2012/0310023 | A1 | 12/2012 | Huang et al. |
| 2014/0178262 | A1 | 6/2014 | Tran et al. |
| 2015/0361374 | A1 | 12/2015 | Kumar et al. |
| 2016/0369174 | A1 | 12/2016 | Kool et al. |
| 2019/0169504 | A1 | 6/2019 | Gu et al. |
| 2020/0238269 | A1 | 7/2020 | Delferro et al. |
| 2021/0061971 | A1 | 3/2021 | Delferro et al. |

FOREIGN PATENT DOCUMENTS

| | | |
|---|---|---|
| JP | 5111246 B2 | 1/2013 |
| WO | WO-2007/126120 A1 | 11/2007 |
| WO | WO-2007/126123 A1 | 11/2007 |
| WO | WO-2021/041323 A1 | 3/2021 |

OTHER PUBLICATIONS

Kanbur, et al., "Catalytic carbon-carbon bond cleavage and carbon-element bond formation give new life for polyolefins as biodegradable surfactants," Chem 7(5), pp. 1347-1362 (2021).

Tennakoon, et al., "Catalytic upcycling of high-density polyethylene via a processive mechanism," Nature Catalysis 3, pp. 893-901 (2020).

Zhang, et al., "Polyethylene upcycling to long-chain alkylaromatics by tandem hydrogenolysis/aromatization," Science 370(6515), pp. 437-441 (2020).

"Advancing Sustainable Materials Management: 2014 Fact Sheet," United States Environmental Protection Agency, EPA530-R-17-01, 22 pages (2016).

Almithn & Hibbitts, "Comparing Rate and Mechanism of Ethane Hydrogenolysis on Transition-Metal Catalysts," The Journal of Physical Chemistry C 123(9), pp. 5421-5432 (2019).

Almithn & Hibbitts, "Effects of Catalyst Model and High Adsorbate Coverages in ab Initio Studies of Alkane Hydrogenolysis," ACS Catalysis 8(7), pp. 6375-6387 (2018).

Andersen, et al., "Pauling's rules for oxide surfaces," Surface Science Reports 73(5), pp. 213-232 (2018).

Beyene, "Recycling of plastic waste into fuels, a review," International Journal of Science, Technology and Society 2(6), pp. 190-195 (2014).

Burange, et al., "Heterogeneously catalyzed strategies for the deconstruction of high density polyethylene: plastic waste valorisation to fuels," Green Chemistry 17(1), pp. 146-156 (2015).

Carr, et al., "Relationship between self-seeded and epitaxial crystallization from polymer solutions: A potentially new method for molecular weight separation and a new decoration method for alkali halides," Journal of Polymer Science: Polymer Physics 8(9), pp. 1467-1490 (1970).

Celik, et al., "Upcycling Single-Use Polyethylene into High-Quality Liquid Products," ACS Central Science 5(11), pp. 1795-1803 (2019).

Che & Bennett, "The Influence of Particle Size on the Catalytic Properties of Supported Metals," Advances in Catalysis 36, pp. 55-172 (1989).

Chesters, et al., "The reflection-absorption infrared spectra of n-alkanes adsorbed on Pt (111)," Surface Science 209(1-2), pp. 89-99 (1989).

Christensen, et al., "Controlled Growth of Platinum Nanoparticles on Strontium Titanate Nanocubes by Atomic Layer Deposition," Small 5(6), pp. 750-757 (2009).

Crosby, et al., "All Roads Lead to TiO2: TiO2-Rich Surfaces of Barium and Strontium Titanate Prepared by Hydrothermal Synthesis," Chemistry of Materials 30(3), pp. 841-846 (2018).

Crosby, et al., "Wulff shape of strontium titanate nanocuboids," Surface Science 632, pp. L22-L25 (2015).

Deak, "Strontium titanate surfaces," Materials Science and Technology 23(2), pp. 127-136 (2007).

Defaud & Basset, "Catalytic Hydrogenolysis at Low Temperature and Pressure of Polyethylene and Polypropylene to Diesels or Lower Alkanes by a Zirconium Hydride Supported on Silica-Alumina: A Step Toward Polyolefin Degradation by the Microscopic Reverse of Ziegler-Natta Polymerization," Angewandte Chemie 37(6), pp. 806-810 (1998).

Dendooven, et al., "Independent tuning of size and coverage of supported Pt nanoparticles using atomic layer deposition," Nature Communications 8, 1074, 12 pages (2017).

Engelhardt, et al., "Structure Sensitivity of Acrolein Hydrogenation by Platinum Nanoparticles on BaxSr1-xTiO3 Nanocuboids," ChemCatChem 10(3), pp. 632-641 (2018).

Enterkin, et al., "Epitaxial Stabilization of Face Selective Catalysts," Topics in Catalysis 56(18-20), pp. 1829-1834 (2013).

Enterkin, et al., "Oriented Catalytic Platinum Nanoparticles on High Surface Area Strontium Titanate Nanocuboids," Nano Letters 11(3), pp. 993-997 (2011).

Enterkin, et al., "Propane Oxidation over Pt/SrTiO3 Nanocuboids," ACS Catalysis 1(6), pp. 629-635 (2011).

Erdemir, et al., "Carbon-based tribofilms from lubricating oils," Nature 536, pp. 67-71 (2016).

Erdman, et al., "Surface Structures of SrTiO3 (001): A TiO2-rich Reconstruction with a c(4×2) Unit Cell," Journal of the American Chemical Society 125(22), pp. 10050-10056 (2003).

Flaherty & Iglesia, "Transition-State Enthalpy and Entropy Effects on Reactivity and Selectivity in Hydrogenolysis of n-Alkanes," Journal of the American Chemical Society 135(49), pp. 18586-18599 (2013).

Flaherty, et al., "Catalytic Ring Opening of Cycloalkanes on Ir Clusters: Alkyl Substitution Effects on the Structure and Stability of C—C Bond Cleavage Transition States," The Journal of Physical Chemistry C 119(5), pp. 2597-2613 (2015).

Flaherty, et al., "Metal-Catalyzed C—C Bond Cleavage in Alkanes: Effects of Methyl Substitution on Transition-State Structures and Stability," Journal of the American Chemical Society 136(27), pp. 9664-9676 (2014).

Flaherty, et al., "Theoretical and kinetic assessment of the mechanism of ethane hydrogenolysis on metal surfaces saturated with chemisorbed hydrogen," Journal of Catalysis 311, pp. 350-356 (2014).

Goodenough, "Electronic and ionic transport properties and other physical aspects of perovskites," Reports on Progress in Physics 67(11), pp. 1915-1993 (2004).

Grillo, et al., "From Single Atoms to Nanoparticles: Autocatalysis and Metal Aggregation in Atomic Layer Deposition of Pt on TiO2 Nanopowder," Small 14(23), 1800765, 11 pages (2018).

Hahladakis, et al., "An overview of chemical additives present in plastics: Migration, release, fate and environmental impact during their use, disposal and recycling," Journal of Hazardous Materials 344, pp. 179-199 (2018).

Hazrat, et al., "Utilization of Polymer Wastes as Transport Fuel Resources—a Recent Development," Energy Procedia 61, pp. 1681-1685 (2014).

Hibbitts, et al., "Effects of Chain Length on the Mechanism and Rates of Metal-Catalyzed Hydrogenolysis of n-Alkanes," The Journal of Physical Chemistry C 120(15), pp. 8125-8138 (2016).

Hopewell, et al., "Plastics recycling: challenges and opportunities," Philosophical Transactions of the Royal Society B: Biological Sciences 364(1526), pp. 2115-2126 (2009).

Inoue, et al., "Structural and dynamical studies of 13C-labeled polyethylene adsorbed on the surface of silica gel by high-resolution solid-state 13C NMR spectroscopy," Acta Polymerica 46, pp. 420-423 (1995).

Jia, et al., "Efficient and selective degradation of polyethylenes into liquid fuels and waxes under mild conditions," Science Advances 2(6), e1501591, 7 pages (2016).

Kennedy, et al., "Replication of SMSI via ALD: TiO2 Overcoats Increase Pt-Catalyzed Acrolein Hydrogenation Selectivity," Catalysis Letters 148(8), pp. 2223-2232 (2018).

Kienzle & Marks, "Surface transmission electron diffraction for SrTiO3 surfaces," CrystEngComm 14(23), pp. 7833-7839 (2012).

Kienzle, et al., "Vacant-site octahedral tilings on SrTiO3 (001), the ([sqrt]13×[sqrt]13)R33.7 surface, and related structures," Physical Review Letters 106(17), 176102, 4 pages (2011).

(56) References Cited

OTHER PUBLICATIONS

Kresse & Furthmuller, "Efficiency of ab-initio total energy calculations for metals and semiconductors using a plane-wave basis set," Computational Materials Science 6(1), pp. 15-50 (1996).
Kresse & Furthmuller, "Efficient iterative schemes for ab initio total-energy calculations using a plane-wave basis set," Physical Review B 54(16), pp. 11169-11186 (1996).
Kresse & Hafner, "Ab initio molecular dynamics for liquid metals," Physical Review B 47(1), pp. 558-561 (1993).
Kresse & Hafner, "Ab initio molecular-dynamics simulation of the liquid-metal-amorphous-semiconductor transition in germanium," Physical Review B 49(20), pp. 14251-14269 (1994).
Kurosu, et al., "Structural characterization of 13C-labeled n-tetracosane adsorbed on the surface of silica gel by high-resolution solid-state 13C NMR spectroscopy," Journal of Molecular Structure 516(2-3), pp. 177-184 (2000).
Lin, et al., Synthesis-dependent Atomic Surface Structures of Oxide Nanoparticles, Physical Review Letters 111(15), 156101, 5 pages (2013).
Manner, et al., "Melting of Rodlike Molecules on Pt(111). Infrared Spectroscopic Studies of Isotopically Labeled n-Alkanes," The Journal of Physical Chemistry B 102(44), pp. 8816-8824 (1998).
Marks & Peng, "Nanoparticle shape, thermodynamics and kinetics," Journal of Physics: Condensed Matter 28(5), 053001, 48 pages (2016).
Mastral, et al., "Catalytic degradation of high density polyethylene over nanocrystalline HZSM-5 zeolite," Polymer Degradation and Stability 91(12), pp. 3330-3338 (2006).
Nakaji, et al., "Regioselective hydrogenolysis of alga-derived squalane over silica-supported ruthenium-vanadium catalyst," Fuel Processing Technology 176, pp. 249-257 (2018).
Oya, et al., "Catalytic Production of Branched Small Alkanes from Biohydrocarbons," ChemSusChem 8(15), pp. 2472-2475 (2015).
Rabuffetti, et al., "Synthesis-Dependent First-Order Raman Scattering in SrTiO3 Nanocubes at Room Temperature," Chemistry of Materials 20(17), pp. 5628-5635 (2008).
Rahimi & Garcia, "Chemical recycling of waste plastics for new materials production," Nature Reviews Chemistry 1, 0046, 11 pages (2017).
Wong, et al., "Catalytic Cracking of LDPE Dissolved in Benzene Using Nickel-Impregnated Zeolites," Industrial & Engineering Chemistry Research 55(9), pp. 2543-2555 (2016).
Wu, et al., "Formation and Nature of Carbon-Containing Tribofilms," ACS Applied Materials & Interfaces 11(17), pp. 16139-16146 (2019).
Yang & Somorjai, "Adsorption and Reactions of C6 Hydrocarbons at High Pressures on Pt(111) Single-Crystal Surfaces Studied by Sum Frequency Generation Vibrational Spectroscopy: Mechanisms of Isomerization and Dehydrocyclization of n-Hexane," Journal of the American Chemical Society 126(24), pp. 7698-7708 (2004).
Zhang, et al., "Adhesion of Pt Nanoparticles Supported on y-Al2O3 Single Crystal," The Journal of Physical Chemistry C 117(41), pp. 21407-21412 (2013).
Zhuo & Levendis, "Upcycling waste plastics into carbon nanomaterials: A review," Journal of Applied Polymer Science 131(4), 39931, 14 pages (2014).
Hsieh, et al., "Shape-Tunable SrTiO3 Crystals Revealing Facet-Dependent Optical and Photocatalytic Properties," The Journal of Physical Chemistry C 123(22), pp. 13664-13671 (2019).
International Search Report & Written Opinion for PCT/US2020/047654 dated Nov. 20, 2020, 9 pages.
Jena, et al., "Studies on the ionic transport and structural investigations of La0.5Li0.5TiO3 perovskite synthesized by wet chemical methods and the effect of Ce, Zr substitution at Ti site," Journal of Materials Science 40, pp. 4737-4748 (2005).

\* cited by examiner

SCHEME 1

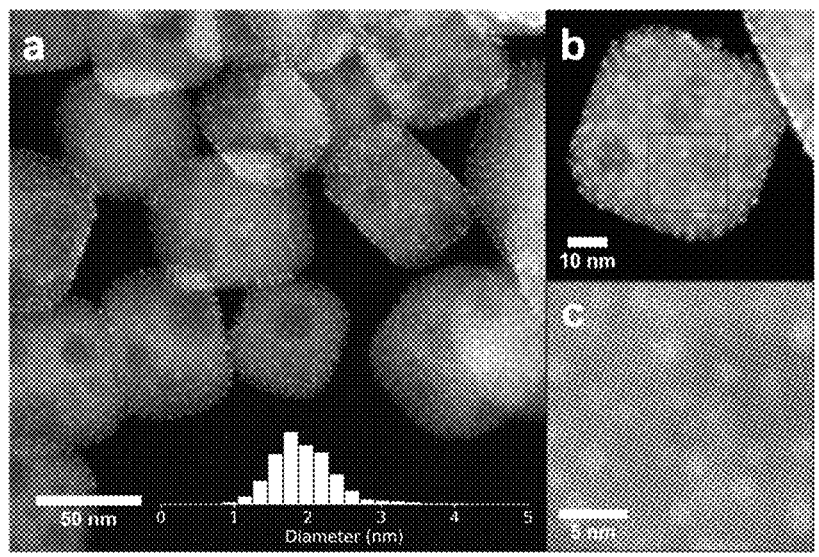
FIG. 2B
FIG. 2C
FIG. 2A
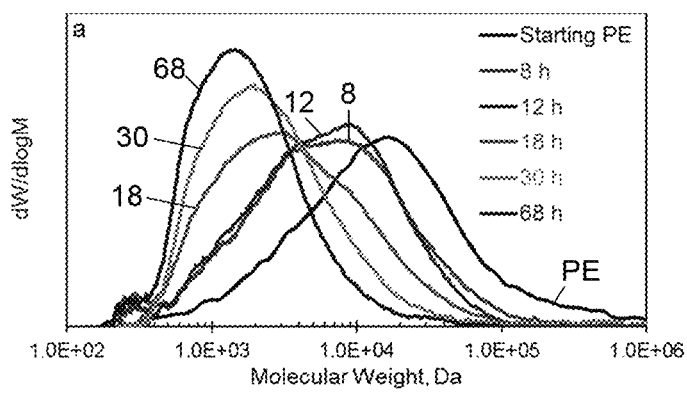
FIG. 3A
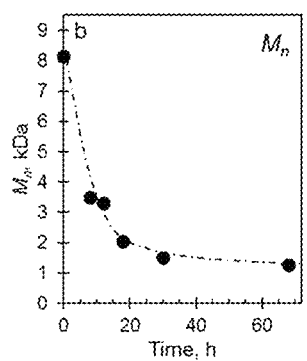
FIG. 3B
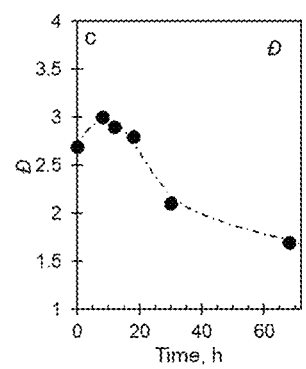
FIG. 3C

CATALYTIC UPCYCLING OF POLYMERS

CROSS-REFERENCE TO RELATED APPLICATIONS

This application claims priority to and the benefit of U.S. Provisional Patent Application No. 62/892,347, filed on Aug. 27, 2019, the content of which is herein incorporated by reference in its entirety.

GOVERNMENT SUPPORT CLAUSE

This invention was made with government support under Contract No. DE-AC02-06CH11357 awarded by the United States Department of Energy to UChicago Argonne, LLC, operator of Argonne National Laboratory, and under Contract No. DE-AC02-07CH11358 awarded by the United States Department of Energy to Iowa State University of Science and Technology, operator of Ames Laboratory. The government has certain rights in the invention.

TECHNICAL FIELD

The present disclosure relates generally to a catalyst and process for selectively converting plastics into other hydrocarbon products.

BACKGROUND

Synthetic polymers have quickly become engrained in everyday use. In particular, those polymers—commonly referred to as plastics—have become a ubiquitous part of modern consumer culture, consuming a large amount of global resources and generating a large amount of waste materials. The three hundred million tons of plastics that are created and discarded annually consume 6.8% of the crude oil and natural gas produced worldwide. In the United States alone, thirty million tons of polymers are produced each year; 75% of these materials are discarded to landfill after a single use.

In light of both the large drain on global resources and the massive amount of waste material generated, plastics represent a tremendous and as-yet-untapped domestic resource for the production of chemicals and new materials. Efficient technologies for extracting this value from discarded polymers would be equivalent to recovering about 3.5 billion barrels of oil ($175 billion at $50/barrel) each year and could create entirely new industries. Currently, most of the stored energy in plastics is irreversibly lost into landfills that are overflowing throughout our planet. While physical recycling is desirable and wide-spread in many areas for a wide range of materials, it is most effective for recovering glass, paper, and metals such as aluminum. To date, recycling has not be able to efficiently and cleanly recoup the inherent value in plastics, especially low density polyethylene (plastic bags), polypropylene, and polystyrene. As a result, many plastics are just burned as fuel or inefficiently reprocessed to manufacture lower-value materials (known as downcycling). Plastics are expensive, highly engineered materials that are wasted as boiler fuel. Existing deconstruction approaches can convert the macromolecules into smaller fragments, but the result is an extremely broad distribution of lighter hydrocarbons whose low value makes them much less useful than virgin fossil fuels and petrochemicals.

Prior work has developed processes to utilize waste plastic as a feed stock. For example, current polymer conversion processes utilize catalytic hydrocracking or pyrolysis with zeolites, or gasification (Beyene, 2014; Hazrat, et al., 2014). These processes which occur at high temperature, above 500° C., lead to a broad distribution of fuel-type hydrocarbons (Zhuo, et al., 2014; Beyene, 2014; WO2007126123A1; JP2003321682A). However, these current processes include several limiting or undesirable steps. For example, the plastic or polymer has to be dissolved in solvent at high temperature, such as 150° C. (WO2007126123A1; JP2003321682A; JP4154929B2; JP5111246B2), and washed, and impurities have to be extracted to remove chlorine compounds that are detrimental to catalysts (WO2007126120A1). The addition of solvent or water to the process is not only costly but it also decreases the overall yield (Beyene, 2014). Additional reactions after hydrogenolysis have been reported, including cyclization for increasing the benzene, toluene and xylene ("BTX") fraction (JP2003321682A) and separations of the products (JP41549229B2; JP41549229B2; JP5111246B2). Conditions for hydrogenolysis are harsher, with temperatures ranging from 300° C. to 500° C., and pressure ranging from 145 to 2950 psi (WO2007126123A1; JP2003321682A).

Thus, there remains a need for a process for recycling plastics into useful materials, in particular for upcycling plastics into heavier hydrocarbon materials, such as wax lubricants rather than down cycling to lower-value light hydrocarbons with tunable selectivity.

SUMMARY

Some embodiments described herein relate generally to a method of processing a polymer. The method includes exposing, at a temperature of 100° C. to 500° C., a plurality polymer molecules to a catalyst comprising a substrate having a plurality of catalytic nanoparticles deposited thereon; docking a first polymer molecule of the plurality of polymer molecules to the catalyst; cleaving at least one carbon-carbon bond of the first polymer molecule; forming a plurality of hydrocarbon fragments from the cleaving; selectively docking to the catalyst a second polymer molecule of the plurality of polymer molecules, preferentially over the plurality of carbon fragments; cleaving at least one carbon-carbon bond of the second polymer molecule; and forming a second plurality of hydrocarbon fragments from the cleaving.

Other embodiments described herein relate generally to a catalyst comprising a substrate and a plurality of platinum nanoparticles disposed on the substrate. The plurality of ordered metal nanoparticles having a diameter of 1 to 3 nm and a ratio of facets to ridges of less than 0.286.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIGS. 2A-2C are electron micrographs of Pt nanoparticles ("NPs") with an average size of 2.0±0.5 nm, deposited by atomic layer deposition ("ALD") on $SrTiO_3$ nanocuboid sup-ports via 5 ALD cycles. Inset: histogram for Pt particle size distribution on 5c-Pt/$SrTiO_3$.

FIGS. 3A-3C are graphs showing weight distribution (FIG. 3A), $M_n$ (FIG. 3B), and polydispersity ("Đ") plots (FIG. 3B) of the HQL products with respect to time over 5c-Pt/$SrTiO_3$. Reaction conditions: 170 psi $H_2$, 300° C., 3 g PE, and 8 mg of platinum as 5c-Pt/$SrTiO_3$.

FIG. 6A is a graph of the effect of catalyst loading; FIG. 6B is a graph of the effect of reaction time; FIG. 6C is a graph of the $H_2$ pressure; and FIG. 6D is a graph of the temperature on $M_n$. Unless otherwise mentioned, reaction conditions are as the followings: catalyst amount=0.14 mg Pt as 5c-Pt/$SrTiO_3$ (1.4% wt % Pt), time=24 h, $H_2$ pressure=170 psi, and temperature=300° C.

FIGS. 11A-11B are an electron micrograph (FIG. 11A) of Pt/$Al_2O_3$ with a histogram (FIG. 11B) showing the particle size distribution as synthesized; FIGS. 11C-11D are an electron micrograph (FIG. 11C) of Pt/$Al_2O_3$ with a histogram (FIG. 11D) showing the particle size distribution as after 18 hours of PE hydrogenolysis in a batch reactor. The Pt NP distribution can be described as bimodal, with sub-2 nm particles and >5 nm particles.

Figure 1A:
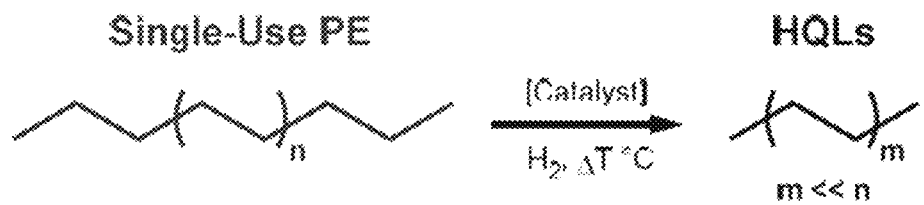
FIG. 1A is a reaction scheme for a catalyzed conversion of polyethylene ("PE") to a high-quality liquid ("HQL").

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments herein relate to catalysts for and method of processing polyolefins into lower molecular weight hydrocarbon materials. Catalysts must be able to (i) induce docking of a polymer chain at a specific location, (ii) control the configuration of the adsorbed chain on the surface of the catalyst, and (iii) cleave a certain bond at a precise position along the chain to deconstruct hydrocarbon polymers efficiently into fragments of relatively uniform size.

As used herein, smaller fragments refer to fragments having a size, typically expressed in terms of carbon backbone length of the fragment, selected based on chosen parameters of the catalytic material, most notably particle size, particularly the facets relative to edges, including corners, of the particle. Further, references herein to "short alkanes" refers to alkanes with C1-C50. The metal nanoparticle catalysts promote carbon-carbon bond cleaving in presence of hydrogen (hydrogenolysis) through a "chopping" approach wherein the polymer is docked and cleaved.

As described further below, catalytic materials provide for a selective cleaving of the hydrocarbon. The nanoparticles have facets and edges due to their crystalline structure. Edges of a solid catalytic material, such as Pt, cleave at multiple adjacent locations on a hydrocarbon. For example, when a hydrocarbon is docked to the catalyst and positioned to be engaged by the edges, the hydrocarbon may be cleaved in multiple locations resulting in relatively small hydrocarbon fragments, such as C50 or less, specifically such as C10 or less, and where the resultant fragments are gases, thus referred to as gaseous products or waste gases. In contrast, the facets of a catalytic metal, such as Pt, have a significantly reduced chance of cleaving multiple nearby sites on a hydrocarbon. The result is that the higher the ratio of facets to edges, the more the result of the catalysis will be larger fragments, such as above C10 or above C50. The adsorption of the carbon chain to the metal and support facilitates the favoring of larger chains. It is believed that there is some effect of the strong ordering of hydrocarbons such as polyethylene on the catalyst base material, such as $SrTiO_3$ cuboids, and that 1) there is a stronger interaction between the hydrocarbon chains and Pt/$SrTiO_3$ than Pt/gamma-alumina, 2) for both catalysts the interaction strength increases with carbon chain length, and therefore 3) both catalysts, to varying degrees, preferentially adsorb and therefore hydrogenolyze the longest chains of the hydrocarbons first.

Specifically, metal nanoparticles (e.g., platinum) of a desired size or size range are supported on the surface of a substrate, the metal nanoparticles may be deposited on the substrate by known mechanisms, with ALD being one specific technique used in the examples included herein. The two parameters that control the ratio are 1) the interfacial energy of the metal and support (this can be affected by the facet of the support, or if the metal particle grows on a step or defect on the surface), which controls the stable shape of the metal particle and 2) the size of the metal particle, which can be controlled by the deposition process (e.g., the type of deposition, such as CVD, ALD, etc., or within a particular type of deposition, parameters such as the number of ALD cycles) or post-deposition treatments (e.g., chloro-oxidative redispersion), which determines the relative size of the facets to edges for a given shape, with facets increasing in area faster than the edges increase in length as the particle grows in volume. For the embodiments using Pt/SrTiO$_3$ (Table 3 and Table 6), the preferred edge:facet ratio would be values less than 0.265 (e.g.,1c-Pt/SrTiO$_3$).

Figure 12:
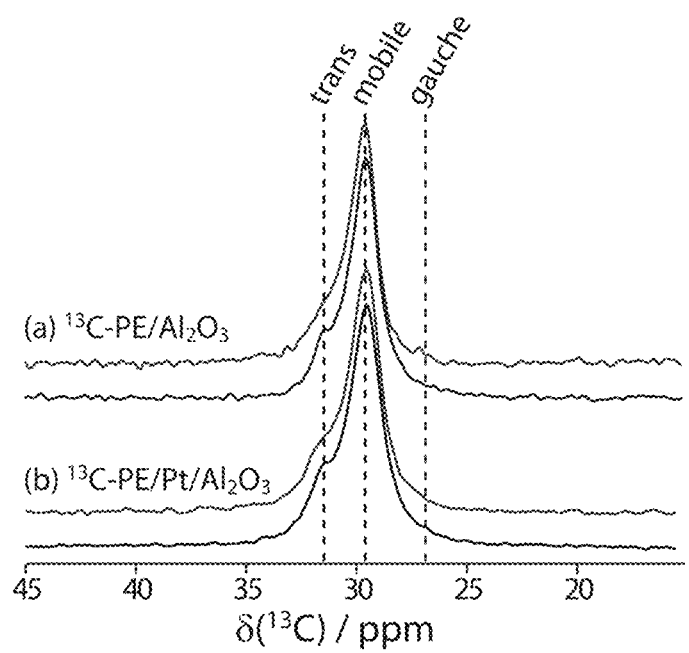
FIG. 12 shows $^{13}C$ MAS (a) and CPMAS (b) spectra of $^{13}C$-enriched PE adsorbed on the mesoporous gamma-alumina ($Al_2O_3$) (a), and Pt/$Al_2O_3$ catalyst (b).

Preferably, the substrate is nonreactive with hydrocarbons. The substrate may be porous (meso- or nano-porous) or non-porous, a crystal material or noncrystal. For example, the substrate may be a perovskite (e.g., strontium titanate) or alumina platelet or spherical materials, the substrate may also be a high surface area porous material, such as mesoporous gamma-alumina, or other oxide materials of varying degrees of shape, faceting, or porosity. The substrate may be any material compatible with ALD and not catalytically reactive with the hydrocarbons. As described further herein the porosity of the support may have a significant effect on the extent of gas formation, (i.e., on the size of the fragments resulting from the hydrocarbon cleavage). The solid state nuclear magnetic resonance ("ssNMR") (see FIG. 4A and FIG. 12) suggests that PE may adsorb in different orientations and different strengths to different support materials, with the strongest adsorption of the materials tested observed for strontium titanate (SrTiO$_3$ or "STO").

In one embodiment, the support material is comprised of crystalline nanocuboids and is a single phase material that is non-reactive with the desired hydrocarbons to be processed. For example, the support material may be a perovskite, for example a perovskite selected from the group consisting of strontium, barium, and calcium titanate or other perovskites with general formula ABO$_3$, or those that are oxygen-deficient, ABO$_{3-x}$ where x is in the range 0≤x≤0.5. The platinum metal and STO have approximately the same lattice constants, creating an epitaxial arrangement of the atoms which stabilizes the interface between the two phases creating the stable PtSTO catalyst, with Pt dispersed on the surfaces of the STO nanocuboids. These Pt NPs are terminated by the family of {111} and {100} surfaces. The Pt NPs on STO are fully exposed to polymer to be processed. The support material may further be a hybrid material comprising a high surface area support material that is amorphous (with a perovskite, such as STO, added thereto).

In another embodiment, the substrate may be a nonporous material, such as alumina. The nonporous substrate may be flat, such as sheet-like, or may be three-dimensional, such as a sphere. The particles sizes are similarly controlled as in the above embodiment using a porous substrate to provide control of the ratio of the facet to edges/corners.

The porosity of the support can be used to control selectivity of the catalyst. For example, decreasing porosity increases selectivity to HQLs, owing to diffusion of polyolefins in the pores, which increases contact time on a single polyolefin molecule and therefore the amount of light gases produced.

The metal nanoparticles are sized to control the facet to edges/corners ratio tuned based on the deposition parameters, including precursor contact time, number of metal deposition cycles, metal precursor, and temperature.

As described, the catalytic material includes nanoparticles on the support material. The catalytic materials may be deposited/grown by ALD. During ALD, the metal precursors bind to the surface (the oxide and already deposited metal particles) as single metal atoms surrounded by ligands in the A-step. When the ligands are driven off in the B-step by a secondary gas (often a reducing or oxidizing agent), the metal atoms become mobile on the surface and move until they reach a stable site. Depending on the reaction conditions, this can be as single atoms, small clusters, or large nanoparticles and can involve moving distances of parts of a nanometer to many nanometers across the surface. The ALD conditions can be modified to control these parameters. In addition, the conditions (temperature, pressure, etc.) of the A-step and B-step can affect whether growth on subsequent cycles primarily add to existing seeds or whether new nanoparticles form. In one embodiment, subsequent ALD deposition cycles of platinum primarily added to existing seeds, leading to highly uniform growth from cycle to cycle, with small changes (increases) in particle distance with cycles. The deposition process allows for controlled deposition and growth of nanoparticles of the catalytic metal on the substrate. Once deposited on the support (such as on an exposed surface), the metal is in the form of a nanoparticle. In particular, the average particle size ranged from 1.2±0.2 (1 cycle) to 2.9±1.1 (10 cycles) nanometers (see FIG. 9), increasing with the number of ALD cycles, and could be increased further with additional cycles or decreased to even smaller sizes by changing the ALD growth conditions.

The nanoparticles have facets and edges defining the surface. The effect of interfacial energy can be compared to a water droplet on a hydrophobic or hydrophilic surface—on the former, it will bead up and expose a lot of surface area; on the latter, it will smooth out across the surface. Unlike a water droplet, a metal particle will have flat facets and sharp edges. Frequently, when there is a lower (stronger) interfacial energy with the support, the resultant stable metal nanoparticle shape minimizes the number of exposed edges. The interfacial energy can be controlled by the choice of metal and support, and can be modified by substitution in the support (e.g., Ba$_x$Sr$_{1-x}$TiO$_3$), oxygen vacancies in the support (e.g., SrTiO$_{3-\delta}$), and alloying of the metal (e.g., platinum and palladium or other combinations). The interfacial energy may also vary depending on the crystallographic facet of the support exposed. In the case of Pt and SrTiO$_3$, the interfacial energies on the different low-index facets of SrTiO$_3$ are similar, but they may vary significantly for other oxides with lower crystallographic symmetry. Notably, facets for catalytic metal such as Pt are selective to desirable hydrocarbons (i.e., C10 or longer or C50 or longer carbon chains), rather than small alkanes, such as gaseous products. In contrast, edges are associated with selectivity to cleaving of the hydrocarbons into small molecules, often gaseous waste materials. As noted, edge sites of metal particles tend to be more active for reactions like hydrogenolysis. It is likely that metal particles with a higher ratio of edge sites will make many rapid cuts to the same hydrocarbon chain, producing light gases.

The nanoparticles could be composed of a single element or of multiple elements. Deposition on support materials may be in an amorphous (i.e., random arrangement). The size and shape of the metal nanoparticles can be selected to decrease the amount of unwanted light gases (e.g., methane) that are produced, with metal particles that have a lower percentage of edge sites exhibiting less gas production.

The nanoparticles may be deposited by ALD. The ALD process may be tuned to deposit nanoparticles with a desired inter-particle space associated with the desired length of the resultant polymer chains following cleaving.

While in some embodiments nanoparticles will be deposited using ALD, the ALD of noble metals, such as Pt, has been shown to produce nanoparticles in the early stages of growth. The modification of steric parameters of the ALD precursors can change the nucleation density, giving rise to nanoparticles with different sizes and inter-particle distances. In addition, variation of the ALD deposition conditions (e.g., contact time, flow rate, number of deposition cycles, and temperature) is also employed to yield an ordered array of metal nanoparticles with controlled inter-particle distance.

In one embodiment, the process includes, and the catalyst facilitates, hydrogenolysis. Hydrocarbon polymers interact with the catalytic material primarily through multi-site (relatively weak) Van der Waals interactions. In some embodiments, the positioning of the nanoparticles is semi-random. There is control over spacing, which is mainly dependent on the diffusion distance and nucleation size of the Pt particles, rather than being on ordered binding sites on the support surface. The particles are evenly spaced, but not highly symmetric or ordered. The strength of adsorption appears to increase with length, leading to an increased concentration of long hydrocarbons at the catalyst surface and, therefore, an increased probability of cleaving the longer chains.

The hydrogenolysis cleaves a carbon-carbon bond in the polymer to create smaller fragments. Feedstock for the process may be unsorted polymer materials, such as commonly used consumer plastics, or may be sorted materials to provide a common polymer as feedstock and result in a consistent hydrocarbon fragment. The catalytic material includes both docking and chopping sites. The docking site helps the polymer to stay close (bounded) to the catalytic active sites (the chopping sites) and not diffuse in the reaction media. A docking site can be also a chopping site, such as where both are the catalytic metal nanoparticle. The preferential docking and cleaving of larger hydrocarbon chains over smaller hydrocarbon chains promotes a more uniform decrease in average hydrocarbon size while maintaining a tighter distribution of sizes, as reflected in the lower percentage of products being small chain materials such as alkane gases.

In one embodiment, the size of the resultant carbon fragment is correlated with a number of factors. As discussed above, the competition to adsorb on the catalyst surface affects the probability of a hydrocarbon chain getting cleaved. As a longer chain is cleaved into two short chains, the two fragments are then out-competed by a longer chain still in the melted mixture, which adsorbs to the catalyst in their place. This exchange process continues, with the highest fraction adsorbing, cleaving, and desorbing, resulting in the population decreasing in length and narrowing in dispersity, until the reaction is stopped or the product is reduced to gases. The rate of exchange may be modified by the reaction temperature and the adsorption energy of the polymer on the catalyst and support.

The hydrogenolysis is facilitated by the catalytic material described at a temperature range of 100° C. to 500° C., for example at 300° C. for 24 h and at a pressure of 15 to 1000 psi. Hydrogenolysis of polymers using the catalyst described herein, in one embodiment, proceeds without the use of a solvent (i.e., solvent-free). As used herein, "solvent-free" refers to the process being carried out with no added solvents (i.e., only the use of polymer products as a feedstock). Note, the polymer products may have incidental solvent either as residue, such as in a plastic container or as a contaminant in the polymer itself while still be "solvent-free."

Because the relative rates of binding and carbon-carbon bond cleavage are key to selective chopping, controlling these rates via reaction conditions and catalyst structure is important. The rate of ethane hydrogenolysis, for example, is approximately $1/p_H$, so adjusting $H_2$ pressure will be used to alter chopping rates. Ethane cleavage rates increase with increasing temperature, and optimal conditions for selective chopping of PE will require balancing pressure and electronic and geometric surface structures to adjust the hydrogenolysis rate.

Experimental Examples

The transformation, as described above, of high molecular weight PE requires the C-C bonds undergo selective hydrogenolysis to produce narrow molecular weight distribution of HQL hydrocarbons. One scheme for this general process is shown in FIG. 1A (Scheme 1). Such liquids, with molecular weight ranging from 200 to 1000 Da, may be perfectly linear or may have branching defined by the polyolefin feedstock and have applications as motor oil or as intermediates (e.g., waxes) that can be further processed to produce ingredients for everyday necessities like detergents and cosmetics. Based on the earlier hydrogenolysis of n-alkanes studies mentioned, this catalytic transformation is expected to take place at high temperatures and pressures. Thus, it is believed that harsh, condensed-phase conditions require exceptionally satisfied nanoparticle-support interactions that resist sintering/deactivation under reaction conditions.

$SrTiO_3$ is an excellent support because its crystalline, highly-ordered, and well-characterized surfaces assist the assembly of ordered NP arrays. $SrTiO_3$ is an archetypical cubic perovskite (Pm-3m), optically transparent and possesses a high band gap. The $SrTiO_3$ used in the present study features single crystal nanocuboids having a sub-100 nm average size, with {100} facets and rounded stepped edges. It is synthesized under hydrothermal conditions, and the majority {100} surface termination has been determined to be the $(\sqrt{13}\times\sqrt{13})R33.7°$ $TiO_2$ double layer surface reconstruction. The $SrTiO_3$ nanocuboids are used as a support for deposition of Pt NPs to form a $Pt/SrTiO_3$ hydrogenolysis catalyst. ALD is chosen for this process because it allows programmed control over key catalyst features that are potentially important to hydrogenolysis. ALD affords Pt NPs rather than films, and the size of the Pt NP depends on the ALD conditions and the interaction between the metal and the support. The close lattice-match between the cubic $SrTiO_3$ and face-centered cubic ("FCC") Pt results in a cube-on-cube epitaxy for Pt NPs on the {100} facets of $SrTiO_3$. The cube-on-cube epitaxy contributes to a large interfacial energy term for the $Pt/SrTiO_3$ interface, which in turn stabilize the Pt NPs.

Experiments investigated 1) $Pt/SrTiO_3$ as a hydrogenolysis catalyst for the upcycling of polyolefin, 2) the adsorption of PE onto the catalyst surface by kinetics, ssNMR spectroscopy, and computational modelling, 3) the structure sensitivity of Pt NPs by varying the facet to edges/corners ratio and by density functional theory ("DFT") models, and 4) the catalytic competence of $Pt/SrTiO_3$ compared to commercially available $Pt/Al_2O_3$ catalysts. It will be seen that the catalytic performance of $Pt/SrTiO_3$ balances on preferential binding of longer hydrocarbon chain onto the Pt surface and the rate of hydrogenolysis at different catalytic sites (facet versus edge/corner). Thus, controlling the Pt edge to facet ratio is essential for suppressing over-hydrogenolysis.

Methods.

SrTiO$_3$ nanocuboids were synthesized hydrothermally according to literature procedures. Pt NPs were deposited onto the SrTiO$_3$ using ALD in a viscous flow reactor. ALD precursor (MeCp)PtMe$_3$ (Strem Chemicals, 99%) and 70% out-put O$_3$ (Pacific Ozone L11 Ozone Generator, ultra-high purity 20 Torr O$_2$ source) were used. The ALD deposition temperature was set to 200° C. A pre-treatment of O$_3$ exposure at 200° C. for 2 h was used for all ALD-prepared Pt samples. The resulting samples were characterized by TEM and inductively coupled plasma—optical emission spectrometry ("ICP-OES"). ssNMR experiments were performed using $^{13}$C-labeled PE adsorbed onto the surface of the samples. DFT calculations were performed using the Vienna ab initio simulation package ("VASP"). A Parr reactor and a high-throughput SPR (Unchained Labs) at the Argonne National Laboratory's High-Throughput Research Laboratory were used for catalytic activity experiments. Activity experiments were performed under solvent-free conditions at 170 psi and 300° C., unless otherwise noted.

Catalyst Synthesis and Materials.

SrTiO$_3$ Synthesis.

SrTiO$_3$ nanocuboids were synthesized hydrothermally, following previously published procedures. Glacial acetic acid (>99), strontium hydroxide octahydrate (99.995% trace metals basis), anhydrous ethanol (99.5%), titanium tetrachloride (99.9% trace metals basis), and sodium hydroxide pellets (99.99% trace metals basis) were purchased from Sigma Aldrich and used without additional purification. Strontium hydroxide and sodium hydroxide were stored in a vacuum desiccator. Ethanol and titanium tetrachloride were stored in a glove box under nitrogen. The acidic titanium tetraethoxy ethanol solution was prepared in the glove box and transferred to a fume hood after the solution had ceased fuming. Mixing the titanium tetrachloride and ethanol under nitrogen minimized unwanted side reactions with water or oxygen, observable by a dark orange color in the solution. The solutions were heated in Parr autoclaves to 240° C. at 1° C/minute and held at that temperature for 36 hours before cooling to room temperature.

Pt/SrTiO$_3$ Synthesis by Atomic Layer Deposition.

Pt NPs were deposited onto the SrTiO$_3$ nanocuboid supports using atomic layer deposition in a viscous flow reactor, adapted from previously described methods. Trimethyl(methylcyclopentadienyl)platinum(IV) ((MeCp)PtMe$_3$, Strem Chemicals, 99%) and 70% output O$_3$ (Pacific Ozone L11 Ozone Generator, ultra-high purity ("UHP") 20 Torr O$_2$ source) was used with 300 s static doses of each precursor with 300 s N$_2$-assisted purge steps. Reactor temperature was set to 200° C. with the Pt bubbler set to 65° C. and Pt line set to 80° C. A pre-treatment of O$_3$ exposure at 200° C. for 2 h was used for all ALD-prepared Pt samples. A various number of ALD cycles were used to prepare Pt NPs of various sizes, ranging from 1 to 10 ALD cycles. The ozone pre-treatment used should produce a suitable amount of nucleation sites for Pt ALD and remove possible carbonates on the surface.

Commercial Catalysts.

Pt/Al$_2$O$_3$ (1 wt % Pt, Sigma Aldrich) and γ-Al$_2$O$_3$ (Strem Chemicals) catalysts were obtained commercially. Pt/Al$_2$O$_3$ was ground to obtain fine powder samples. γ-Al$_2$O$_3$ was used as received.

$^{13}$C-labeled Polyethylene Synthesis.

Ethylene-$^{13}$C (99% enriched 1,2-$^{13}$C$_2$) was obtained from Cambridge Isotope Lab in a 250 mL glass vessel and used without purification. Methylaluminoxane ("MAO") was obtained from Sigma-Aldrich as a 10 wt % in toluene solution; toluene was evaporated, and the white solid material was washed with pentane (5×10 mL) to give a shiny white solid after exhaustive drying. The titanium polymerization catalyst containing a bulkier phenoxyimine chelating ligand was synthesized following literature procedure.

$^{13}$C-labeled polyethylene was prepared by the following procedure: A Schlenk round bottom flask was charged with a toluene solution (50 mL) of MAO (0.044 g, 0.74 mmol). 1,2-$^{13}$C$_2$H$_4$ (250 mL) was condensed into the reaction vessel cooled in a liquid nitrogen bath. The vessel was sealed and allowed to warm to room temperature, and then the mixture was cooled to 0° C. The Ti-phenoxyimine catalyst (0.002 g, 0.002 mmol), dissolved in a minimal amount of toluene, was added to the reaction mixture through a septum. The resulting solution was stirred at 0° C. for 10 min and then allowed to warm to room temperature. Stirring was continued for 30 min at room temperature. The solution was then poured into a 5% HCl in MeOH solution to precipitate the polymer. The precipitate was isolated by filtration and dried under reduced pressure to yield $^{13}$C-labeled polyethylene as a white solid (0.43 g). The polymer was characterized by HT GPC (M$_n$=132,000 kg/mol; M$_w$=429,800; Đ=3.2).

$^{13}$C-labeled polyethylene was adsorbed onto the surface of the support by the following procedure: $^{13}$C-labeled polyethylene (12 mg) and the appropriate support (100 mg) were mixed in 1,2-dichlorobenzene (5 mL). This suspension was heated to 130° C. for 6 h. The liquid was separated from the solid by decanting while hot (~130° C.), and the solid was washed with hot (~130° C.) 1,2-dichlorobenzene (3×10 mL). The material was dried under vacuum at 120° C. for 12 h.

Results.

Catalytic Hydrogenolysis of Polyethylene Using Pt/SrTiO$_3$.

The catalyst support—SrTiO$_3$ nanocuboids with an average size of 65±19 nm—was synthesized via hydrothermal methods. Five ALD cycles (5c) of Pt deposition using trimethyl(methylcyclopentadienyl)platinum(IV) precursor and ozone on SrTiO$_3$ afforded highly dispersed Pt NPs with an average size of 2.0±0.5 nm (FIG. 2B). A growth rate of 1.9±0.2 wt %/cycle was established on the SrTiO$_3$ surface as measured by ICP-OES. The catalytic performance of 5c-Pt/SrTiO$_3$ was first investigated using a PE with M$_n$=8,150 Da, M$_w$=22,150 Da, and Đ of 2.7, employing a high-throughput batch reactor. Reaction parameters that were varied; FIGS. 6A-6D include catalyst loading (from 1 to 50 mg), reaction temperature (100, 300, and 350° C.), hydrogen pressure (100, 170, 400, and 600 psi), and reaction duration (up to 96 h). Optimized experimental conditions based on conversion of PE into HQL products are: 170 psi H$_2$ at 300° C. under solvent-free conditions for 96 h, 10 mg of catalyst per 50 mg of PE. Solvent-free conditions have been chosen to eliminate competing adsorption and reaction of the hydrocarbon solvent with PE. Under these reaction conditions, 5c-Pt/SrTiO$_3$ converts the starting PE into a high-quality lubricant-like product (M$_n$=590 Da, M$_w$=625 Da, and Đ=1.1) at a yield of 42% (yield=mass of liquid hydrocarbons vs initial mass of PE; Table 1). Signals that might be assigned to C=C were not detected in solution phase $^{13}$C and $^1$H nuclear magnetic resonance ("NMR") spectra of the liquid product, suggested that 5c-Pt/SrTiO$_3$ is also active for the hydrogenation of olefins present in the starting PE.

The control experiment performed under thermal hydrogenolysis (no catalyst) in the presence of $H_2$ shows a significant reduction in $M_n$ (from 8,150 to 5,700 Da), whereas $M_w$ exhibits a slight decrease (from 22,150 to 18,200 Da), resulting in broadened distribution of polymeric material (Đ=3.2). Note also that another control experiment of hydrogenolysis of PE using Pt-free $SrTiO_3$ displays negligible changes in $M_n$ (7,750 Da) and $M_w$ (21,350 Da; Table 1), indicating that the Pt is responsible for catalytic hydrogenolysis. The catalytic performance of 5c-Pt/$SrTiO_3$ was further examined using PE with different molecular weights ($M_n$=8,000 to 160,000 Da and $M_w$=18,000 to 420,000 Da). The 5c-Pt/$SrTiO_3$ catalyst again completely converts PE into the same low-molecular weight product in high yield and narrow molecular weight distribution independently of the chain length of the starting PE (Table 1). Remarkably, the catalytic hydrogenolysis of PE is also effective starting with a single-use, commercial-grade plastic bag as a feedstock ($M_n$=33,000 Da, $M_w$=115,150 Da, and Đ=3.5) to afford similar HQL products ($M_n$=990 Da, $M_w$=1,130 Da, and Đ=1.3) as obtained from research grade high density polyethylene (Table 1). These results suggest that the additives present in the plastic bag may not affect the catalyst.

TABLE 1

Properties of the starting PE and hydrogenolyzed products over no catalyst (thermal hydrogenolysis), $SrTiO_3$, and 5c-Pt/$SrTiO_3$ using the SPR. Reaction conditions: 170 psi $H_2$, 300° C., 24 h, 50 mg PE ($M_n$ = 8,150 Da), 10 mg of $SrTiO_3$ or 1.1 mg of Pt as 5c-Pt/$SrTiO_3$ (11.1 wt % Pt).

| Entry | $M_n$ (Da) | $M_w$ (Da) | Đ |
|---|---|---|---|
| Starting PE | 8,150 | 22,150 | 2.7 |
| Thermal hydrogenolysis, no catalyst | 5,600 | 23,250 | 4.2 |
| $SrTiO_3$ | 7,750 | 21,350 | 2.8 |
| 5c-Pt/$SrTiO_3$ | 2,150 | 10,050 | 4.7 |

Polyethylene-Catalyst Interaction.

Several sets of experiments were performed in order to gain insight into possible relationship between selective conversion and the interactions between polymer and the catalyst surface, including: i) monitoring the change in molecular weight and distribution versus time, ii) measuring the conformation of adsorbed PE, and iii) determining the strength of adsorption of alkanes on relevant crystalline facets.

Hydrogenolysis of PE in a Parr batch reactor at 170 psi $H_2$ and 300° C. affords hydrogenolyzed products with progressively shifted $M_n$ to lower molecular weights over a series of reaction times (FIGS. 3A-3C). This progressive shift indicates that all of the molecules in the sample are hydrogenolyzed to some extent. Conversion of the starting polymer $M_n$ of 8,150 to 625 Da corresponds to an average of 12 C-C bond cleavage steps per chain by the end of the reaction. Importantly, the decreasing Đ also suggests that the PE chains with the highest molecular weights are more susceptible to hydrogenolysis than molecules with lower molecular weights. Carr, et al., have shown that the highest molecular weight fraction of PE and other polymers preferentially adsorb to alkali halide crystals and that this adsorption could be used to preferentially extract the highest molecular weight fraction of a given sample. A similar preferential adsorption of longer chains onto 5c-Pt/$SrTiO_3$ is consistent with the low dispersity of hydrocarbon chains, whereas preferential adsorption of lighter molecules to the catalyst would result in increased Đ with time as lighter species are hydrogenolyzed into even shorter chains. Given that sequential hydrogenolysis takes place and leads to selective formation of narrower HQL products, it is reasonable to assume that PE adsorption on the catalyst surface plays a key role in the overall performance.

TABLE 2

Properties of PE feedstocks and hydrogenolyzed products over thermal hydrogenolysis or catalytic hydrogenolysis using 5c-Pt/$SrTiO_3$. Reaction conditions: 170 psi $H_2$, 300° C., 96 h, and 50 mg PE, and 1.1 mg of Pt as 5c-Pt/$SrTiO_3$ (11.1 wt % Pt loading).

| Entry | $M_n$ (Da) | $M_w$ (Da) | Đ | Yield* (%) |
|---|---|---|---|---|
| PE | 8,150 | 22,150 | 2.7 | n/a |
| Thermal | 5,700 | 18,200 | 3.2 | >99 |
| 5c-Pt/$SrTiO_3$ | 590 | 625 | 1.1 | 42 |
| PE | 15,400 | 17,200 | 1.1 | n/a |
| Thermal | 17,300 | 19,550 | 1.1 | >99 |
| 5c-Pt/$SrTiO_3$ | 660 | 700 | 1.1 | 68 |
| PE | 64,300 | 70,400 | 1.1 | n/a |
| Thermal | 30,050 | 54,900 | 1.8 | >99 |
| 5c-Pt/$SrTiO_3$ | 800 | 920 | 1.2 | 91 |
| PE | 158,000 | 420,000 | 2.7 | n/a |
| Thermal | 16,800 | 136,250 | 8.1 | >99 |
| 5c-Pt/$SrTiO_3$ | 820 | 960 | 1.2 | >99 |
| Plastic Bag | 33,000 | 115,150 | 3.5 | n/a |
| Thermal | 38,800 | 114,800 | 3.0 | >99 |
| 5c-Pt/$SrTiO_3$ | 990 | 1130 | 1.3 | 97 |

*Yield is defined as the mass of the weight of hydrocarbons recovered relative to the initial mass of PE. Owing to the high viscosity of the melt polymer, mass transfer effects cannot be ruled out completely.

Figure 4A:
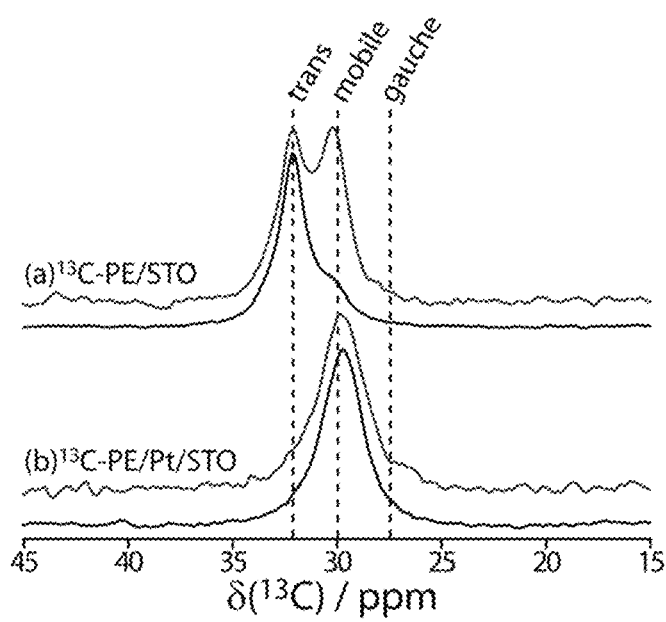
FIGS. 4A-4B show $^{13}C$ magic angle spinning ("MAS") (red) and cross-polarization magic angle spinning ("CP-MAS") (black) spectra of $^{13}C$-enriched PE adsorbed on the $SrTiO_3$ support (top), and Pt/$SrTiO_3$ catalyst (bottom) (FIG. 4A) and a side view of the optimized structures of n-hexane on Pt (111), Pt (100), and $TiO_2$ double-layer terminated $SrTiO_3$ (001) surface models (FIG. 4B).

Examination of the interactions between the hydrocarbon chain and the surface was then carried out by $^{13}C$ MAS ssNMR spectroscopy. A monolayer of $^{13}C$-enriched PE was loaded onto the 5c-Pt/$SrTiO_3$ catalyst and the Pt-free $SrTiO_3$ support. As shown by Ando, et al., $^{13}C$ MAS ssNMR spectroscopy is able to distinguish mobile (δ=30 ppm), trans (δ=32.9 ppm), and gauche (δ=27.5 ppm) PE adsorbed on surfaces, and thus both the rigidity and linearity of PE onto the catalyst surface can be established. The $^{13}C$ MAS spectra are quantitative while the $^1H \rightarrow ^{13}C$ CPMAS spectra highlight the signals from the most rigid polymer molecules; presumably, those that are closest to the surface. As can be seen in FIG. 4A, no signal from gauche conformations can be detected for polymer adsorbed on the $SrTiO_3$ nanocuboid materials despite the presence of a strong resonance belonging to trans-zigzag polymer, indicative of a rigid conformation. This is in stark contrast with polymers adsorbed on silica gel for which clear evidence of non-linearity is present. On the other hand, the polymer mobility is dramatically enhanced when the surface contains Pt NPs (FIG. 4A). This suggests that interactions with the metal NPs prevent the polymer from interacting as strongly with the $SrTiO_3$ surface. Thus, the observed catalytic behavior arises from the adsorption of the long chain hydrocarbon onto the active cleavage metal NP sites.

Figure 4B:
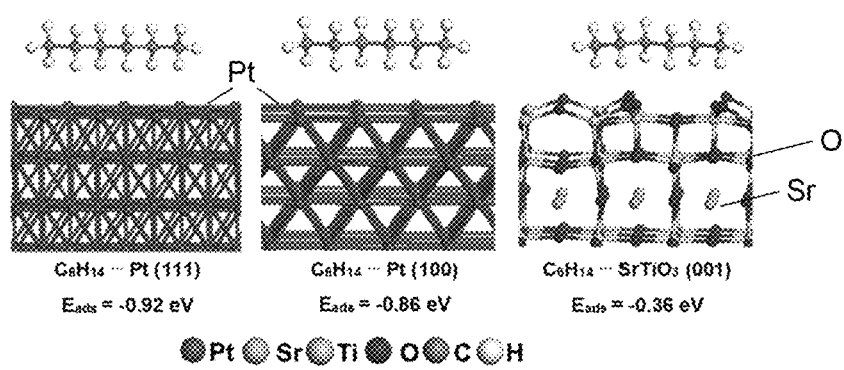
Figure 7:
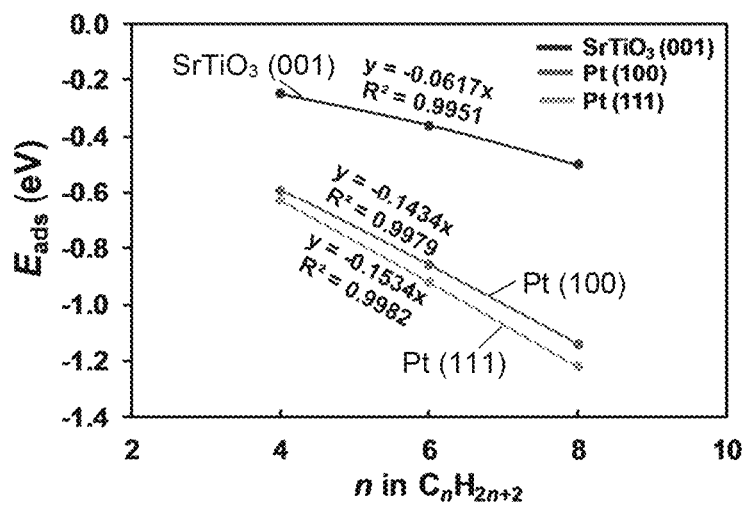
FIG. 7 shows adsorption energies ("$E_{ads}$") of n-alkanes on Pt and $SrTiO_3$ surface models.

Theoretical models support the idea that hydrocarbon molecules interact more strongly with the Pt NPs than with the $SrTiO_3$. DFT calculations were performed using the VASP code based on the SCAN-rVV10 functional and the projector augmented-wave method. The adsorption energies were calculated for the interaction of model n-alkanes ($C_nH_{2n+2}$, n=4, 6, 8) onto Pt(100) and Pt(111) surface models as representations of the Pt NPs, as well as the $TiO_2$ double-layer terminated $SrTiO_3$(001) model as a representation of $SrTiO_3$ support. The n-alkanes prefer to adsorb on Pt surfaces, aligning their C-C bonds with all-trans conformation parallel to the metal surface; thereby, maximizing the number of Pt-H interactions (FIG. 4B) as suggested by previous reflection-adsorption infrared spectroscopic studies and ssNMR. Note that adsorption energy on n-alkanes increases with increasing number of carbon atoms (FIG. 7). The adsorption of n-alkanes on the Pt(111) surface (−0.15 eV per $CH_2$ group) is slightly more favorable compared to the Pt(100) surface (−0.14 eV per $CH_2$). The adsorption of n-alkanes on the $SrTiO_3$ support is found to occur through the oxygen on the $TiO_2$ double-layer terminated $SrTiO_3$ surface, with a lower average binding energy of only about −0.06 eV per carbon atom. The predicted linearity in the binding energy of the n-alkanes with respect to the number of carbon atoms suggests that the trends observed here can be extended to larger alkanes. Furthermore, these results support the earlier hypothesis that the stronger binding of higher molecular weight polymer molecules helps in directing the decrease of the Đ index.

Catalyst Structure Sensitivity of Polyethylene Hydrogenolysis.

The structure sensitivity of hydrogenolysis of short-chain n-alkanes has been well established; however, to the best of our knowledge no catalytic studies have been conducted on the effect of structure sensitivity on polyolefin hydrogenolysis. Here, Pt NPs of different metal loading, size, and edge to facet ratio were synthesized by varying the number of ALD cycles.

Figure 8:
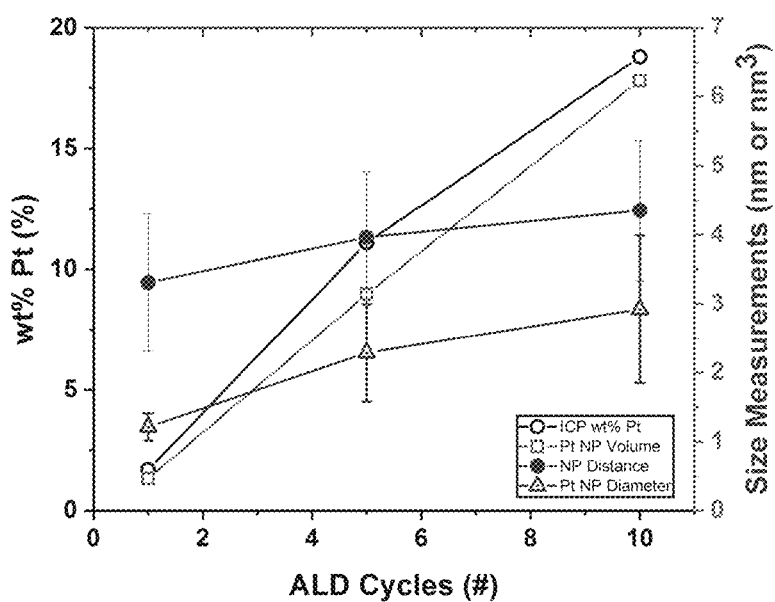
FIG. 8 is a plot of properties of the catalysts with varying number of Pt ALD cycles (1, 5, and 10) and corresponding Pt wt % (determined by inductively coupled plasma ("ICP")), Pt NP diameter (measured by transmission electron microscopy ("TEM")), Pt NP distances (measured by TEM), and Pt NP volume (calculated from Pt NP diameters). A linear regression shows a growth rate of 1.9±0.2 wt % Pt per ALD cycle.
Figures 9A, 9B, 9C:
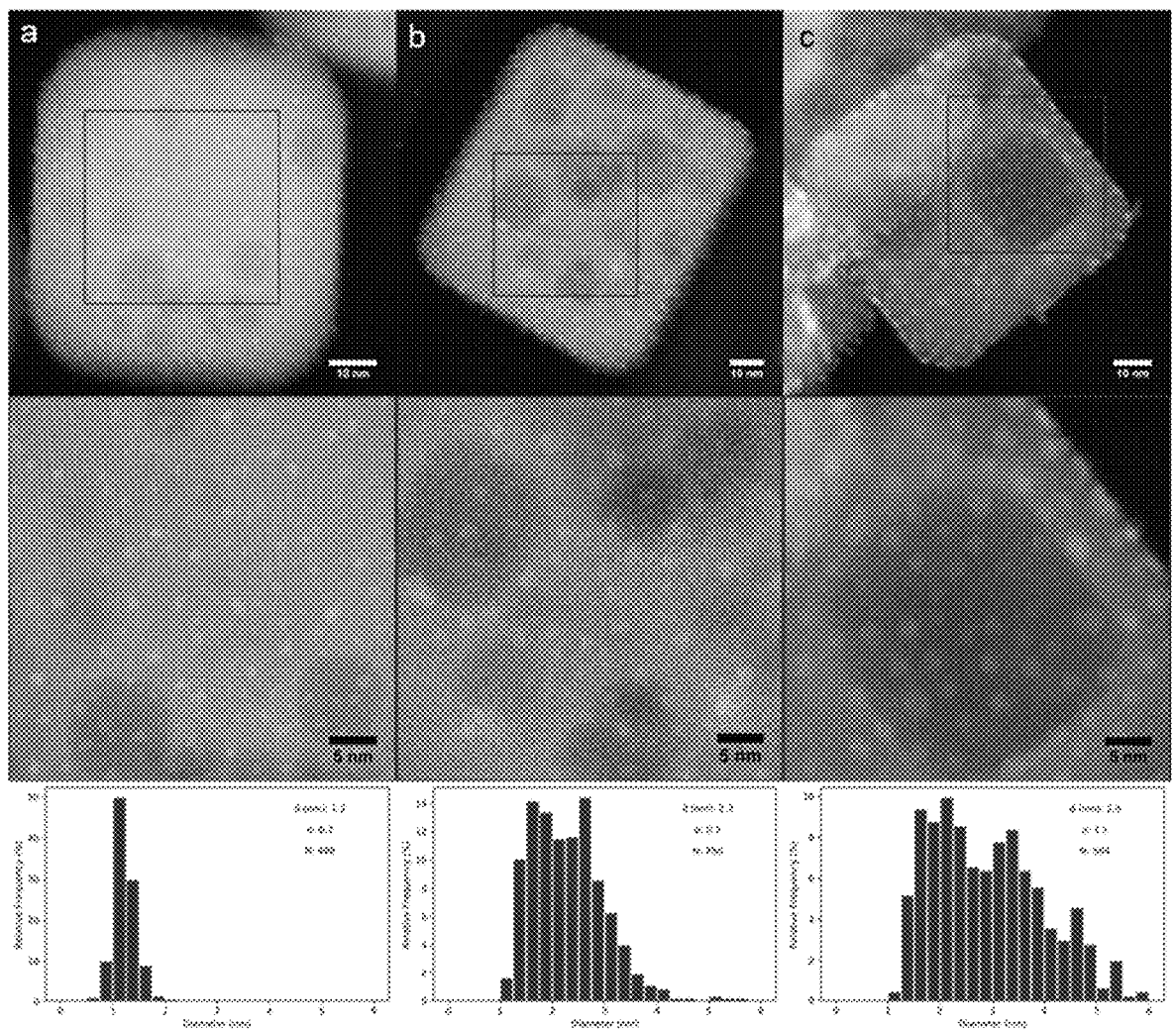
FIGS. 9A-9C are electron micrographs of Pt NPs with an average size of 1.2±0.2 nm (FIG. 9A), 2.3±0.7 nm (FIG. 9B), and 2.9±1.1 nm (FIG. 9C), deposited by ALD on $SrTiO_3$ nanocuboid supports, via (respectively) 1, 5, and 10 ALD cycles. The region highlighted in red is shown as an enlarged inset.

For one cycle (1c-), five cycles (5c-), and ten cycles (10c-) Pt/$SrTiO_3$, the loading of Pt and the volume of the Pt NPs increase linearly with the number of ALD cycles (FIG. 8 and Table 3). Average particle sizes of Pt NPs on 1c-Pt/$SrTiO_3$, 5c-Pt/$SrTiO_3$, and 10c-Pt/$SrTiO_3$ are found to be 1.2±0.2 nm, 2.3±0.7 nm, and 2.9±1.1 nm, respectively (FIG. 9). The majority of Pt particles on the $SrTiO_3$100) facet have a cube-on-cube epitaxy with a truncation of 61% relative to the free Wulff shape of a Pt NPs. The proportion of under coordinated edge sites to the total Pt surface area increases as the diameter of the Pt NPs decreases (Table 3). Similar to previous observations, the spacing of the Pt NPs, measured as the center-to-center distance, increased with the number of ALD cycles.

TABLE 3

Properties of 1c-, 5c-, and 10c-Pt/$SrTiO_3$.

| Catalyst | Pt Loading[a] (wt %) | Average Pt size[b] (nm) | Average Pt edge (nm) to face (nm$^2$) ratio[c] | Average Pt Surface Area[d] (m$^2$ Pt/g cat.) | Average PT NP center-center dist.[b] (nm) |
|---|---|---|---|---|---|
| 1c-Pt/$SrTiO_3$ | 1.7 | 1.2 | 0.265 | 5.9 | 3.3 |
| 5c-Pt/$SrTiO_3$ | 11.1 | 2.3 | 0.138 | 20.0 | 4.0 |
| 10c-Pt/$SrTiO_3$ | 18.8 | 2.9 | 0.109 | 26.8 | 4.4 |

[a]Determined by ICP-OES.
[b]Determined by TEM particle size analysis.
[c]Pt NPs approximated as Winterbottom constructions, with γPt{111}:γPt{100} = 0.84, Pt(100)||$SrTiO_3$(100) at 61% truncation.
[d]Surface area calculated from Pt loading and average particle size, assuming the minimum energy Winterbottom construction.

Hydrogenolysis of PE performed at 300° C. and 170 psi over 1c-, 5c-, and 10c-Pt/$SrTiO_3$ catalysts shows that the Pt particle size and coordination of surface atoms affect the molecular weight and Đ of products. Note, it is generally desirable for the catalyst materials to have an facet:edge ratio below that of the 1 cycle coated material. Catalytic experiments were performed under an equal basis of Pt surface area in the reactor (2,000 cm$^2$ Pt) (Table 2) for 96 h. Catalyst 1c-Pt/$SrTiO_3$ completely transforms PE into gaseous hydrocarbons ($C_1$-$C_8$), while 5c-Pt/$SrTiO_3$ and 10c-Pt/$SrTiO_3$ convert PE into a similar HQL product ($M_n$≈675 Da and Đ=1.1) at yields of 42% and 95%, respectively. In addition, experiments performed for 24 h under equal basis of Pt amount in the reactor (1.0 mg Pt) show that the lowest molecular weight of hydrogenolyzed products is achieved with 1c-Pt/$SrTiO_3$. 1c-Pt/$SrTiO_3$ reduced the $M_n$ from 8,150 to 1,250 in 24 h, while 5c and 10c reduced the $M_n$ to 2,150 and 3,400, respectively. It should be noted that the molecular weight of the hydrogenolyzed products at 24 h ($M_n$=1,250 Da, ~$C_{90}$) is not low enough for mass losses into the headspace to be a significant contributor to yield. Furthermore, for extended time (96 h), 1c-Pt/$SrTiO_3$ completely converts the starting PE into gaseous products while a lubricant-like hydrocarbons ($M_n$≈800 Da and Đ=1.1) are obtained over 5c-Pt/$SrTiO_3$ and 10c-Pt/$SrTiO_3$.

Under the experimental reaction conditions (T=300° C.; $P_{H2}$=170-300 psi), the presence of excess $H_2$ could inhibit the adsorption of PE and limit the availability of active sites for C-C bond hydrogenolysis. The dissociative adsorption of $H_2$ to form surface —OH moieties on the $SrTiO_3$ surface is endergonic ($SrTiO_3$+$H_2$ (gas)→2H . . . $SrTiO_3$, ΔE=−0.09 eV; ΔG=0.48 eV at T=300° C. and $P_{H2}$=300 psi), suggesting that the $SrTiO_3$ surface is free of adsorbed H atoms under experimental conditions. On the other hand, the adsorption of H atoms on Pt surface sites was found to be exergonic under our experimental reaction conditions. The calculations predicted that the average binding energy for a monolayer ("ML") coverage of H calculated with reference to the energy of gas phase $H_2$ is −0.79 eV (ΔG (300° C.)=−0.50 eV) and −0.38 eV (ΔG (300° C.)=−0.10 eV) for the Pt(100) and Pt(111) surfaces, respectively. Removing a single H atom from the 1 ML H-covered surface was found to be endergonic by 0.51 eV on the Pt(100) surface and is slightly exergonic by −0.02eV on the Pt(111) surface. These results suggest that the (100) surface facets are fully covered by H under reaction conditions, whereas some sites are available for the adsorption and cleavage of C-C bonds of the hydrocarbon on the close-packed Pt(111) sites. While the hydrocarbon adsorption strength per site (and carbon atom) is only slightly larger on the fully hydrogenated Pt(100) and (111) surface facets (−0.09 and −0.10 eV, respectively) than on the $SrTiO_3$ support, the hydrocarbon chain is able to displace a large fraction of the surface hydrogen atoms from the (111) facet under reaction conditions. Therefore displacing the surface hydrogen atoms from the (111) facet, the hydrocarbon chain is able to strongly interact with this facet and react with nearby surface hydrogen.

TABLE 4

Catalytic activity comparison of 1c-, 5c-, and 10c-Pt/SrTiO$_3$ under equal surface area (2,000 cm$^2$) or mass (1 mg) of Pt in the reactor. Reaction conditions: 170 psi H$_2$, 300° C., 24 h or 96 h, and 50 mg PE (M$_n$ = 8,150 Da, Đ = 2.7).

| Catalyst | Pt weight Loading[a], % | Average Pt Diameter[b], nm | Pt edge:facet ratio[c], nm:nm$^2$ | Amount of Pt, mg | Surface Area of Pt[d], cm$^2$ | Time, h | M$_n$, Da [e] | Đ[e] | Yield[f], % |
|---|---|---|---|---|---|---|---|---|---|
| Thermal | — | — | — | — | — | 24 | 5,600 | 4.2 | —[g] |
|  |  |  |  |  |  | 96 | 5,700 | 3.2 | >99 |
| *Equal surface area of Pt (2,000 cm$^2$)* | | | | | | | | | |
| 1c-Pt/SrTiO$_3$ | 1.7 | 1.2 | 0.27 | 0.6 | 2,000 | 96 | Over-hydrogenolysis | | 0 |
| 5c-Pt/SrTiO$_3$ | 11.1 | 2.3 | 0.14 | 1.1 |  | 96 | 600 | 1.1 | 42 |
| 10c-Pt/SrTiO$_3$ | 18.8 | 2.9 | 0.11 | 1.4 |  | 96 | 750 | 1.1 | 95 |
| *Equal weight of Pt (1 mg)* | | | | | | | | | |
| 1c-Pt/SrTiO$_3$ | 1.7 | 1.2 | 0.27 | 1.0 | 3,270 | 27 | 1,250 | 4.7 | 91 |
|  |  |  |  |  |  | 96 | Over-hydrogenolysis | | 0 |
| 5c-Pt/SrTiO$_3$ | 11.1 | 2.3 | 0.14 |  | 2,000 | 24 | 2,150 | 4.7 | 97 |
|  |  |  |  |  |  | 96 | 600 | 1.1 | 42 |
| 10c-Pt/SrTiO$_3$ | 18.8 | 2.9 | 0.11 |  | 1,480 | 24 | 3,400 | 3.4 | >99 |
|  |  |  |  |  |  | 96 | 800 | 1.2 | >99 |

[a] Determined by ICP-OES.
[b] Determined by TEM particle size analysis.
[c] Pt NPs approximated as Winterbottom constructions, with γPt{111}:γPt{100} = 0.84, Pt(100)||SrTiO3(100) at 61% truncation.
[d] Surface area calculated from Pt loading and average particle size, assuming the minimum energy Winterbottom construction.
[e] Determined by GPC.
[f] Yield is defined as the mass of the weight of liquid hydrocarbons recovered relative to the initial mass of PE.
[g] Not measured.

Comparison of Pt/SrTiO$_3$ Versus Pt/Al$_2$O$_3$.

Commercially-available Pt/Al$_2$O$_3$ (1 wt %, Sigma Aldrich) provides remarkable contrast to the behavior of 5c-Pt/SrTiO$_3$. The comparison of catalytic activity between 5c-Pt/SrTiO$_3$ and Pt/Al$_2$O$_3$ at the equal basis of Pt amount in the reactor (Table 5) shows that the M$_n$ of the hydrogenolyzed products is similar over both samples (~1,950 Da) after 18 h. Both M$_w$ and Đ, however, highlight the effect of Pt/SrTiO$_3$ on catalytic performance. M$_w$ of the hydrogenolyzed product over 5c-Pt/SrTiO$_3$ (5,800 Da) is significantly lower than that over Pt/Al$_2$O$_3$ (10,750 Da). Negligible variation of Đ of the hydrogenolyzed products from 5c-Pt/SrTiO$_3$ is detected with respect to the starting PE. In contrast, the Đ of the products over Pt/Al$_2$O$_3$ increases to ~6. The broadening of the hydrogenolyzed product distribution from the Pt/Al$_2$O$_3$ catalyst is also observed by pyrolysis gas chromatography-mass ("GC-MS") spectrometry analysis. In addition, the quantification of the gases in the headspace of the reactor by GC revealed that the formation of light hydrocarbons ("HCs") (saturated C$_1$-C$_8$ and cyclic C$_5$-C$_6$ alkanes) is significantly suppressed over 5c-Pt/SrTiO$_3$, when compared to Pt/Al$_2$O$_3$. Note that thermal degradation leads to the formation of C$_1$-C$_8$ gases, even in the absence of any catalyst (Table 5), due to the thermal degradation of the PE. After accounting for the amount of light hydrocarbons formed from the thermal degradation (0.65 mmol, 3 g of PE at 300° C., 170 psi H$_2$ for 18 h), the total number of light hydrocarbons produced over Pt/Al$_2$O$_3$ (1.69 mmol) is more than 3× that produced over 5c-Pt/SrTiO$_3$ (0.52 mmol). This difference constitutes an important advantage since relatively-narrow Đ HQL products are obtained at high yields without producing any substantial amounts of light hydrocarbons.

TABLE 5

Properties of the starting PE, hydrogenolyzed products and number of light hydrocarbons formed over thermal hydrogenolysis, 5c-Pt/SrTiO$_3$, and Pt/Al$_2$O$_3$ using the Parr reactor. Reaction conditions: 170 psi H$_2$, 300° C., 18 h, and 3 g PE, and 8 mg of Pt as 5c-Pt/SrTiO$_3$.

| Entry | M$_n$ (Da) | M$_w$ (Da) | Đ | Light HCs (C$_1$-C$_8$) formed (mmol) |
|---|---|---|---|---|
| Starting PE | 8,150 | 22,150 | 2.7 | n/a |
| Thermal hydrogenolysis | 4,550 | 18,600 | 4.1 | 0.65 |
| 5c-Pt/SrTiO$_3$ | 2,050 | 5,800 | 2.8 | 1.17 |
| Pt/Al$_2$O$_3$ | 1,850 | 10,750 | 5.8 | 2.34 |

Figure 1B:
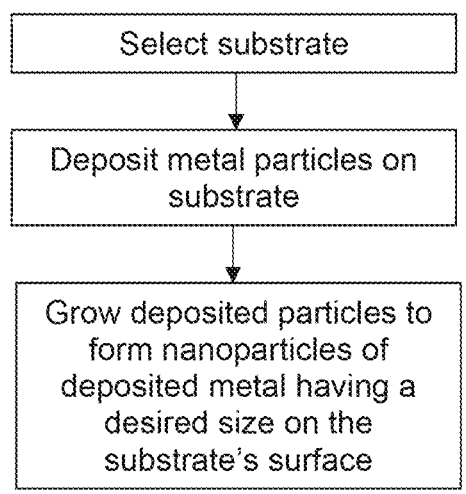
FIG. 1B is a flow chart depicting one method of manufacturing a catalyst having ordered metal nanoparticles supported on a substrate surface.
Figures 10A, 10B:
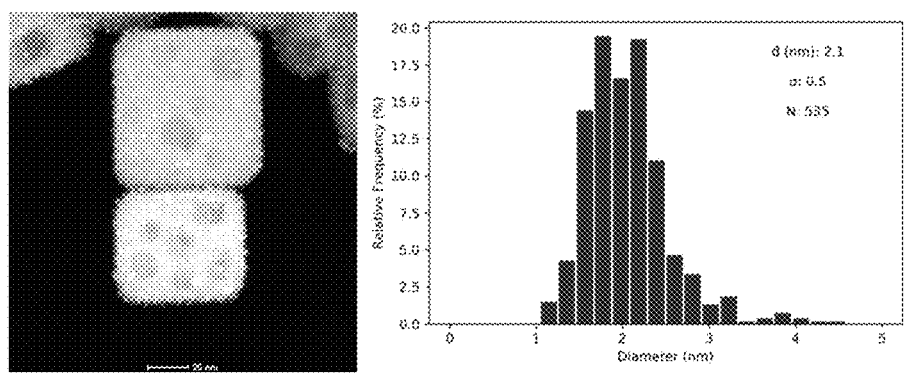
FIGS. 10A-10B are an electron micrograph (FIG. 10A) and histogram (FIG. 10B) of 5c-Pt/$SrTiO_3$ after 18 h of PE hydrogenolysis in a batch reactor.
Figure 11A:
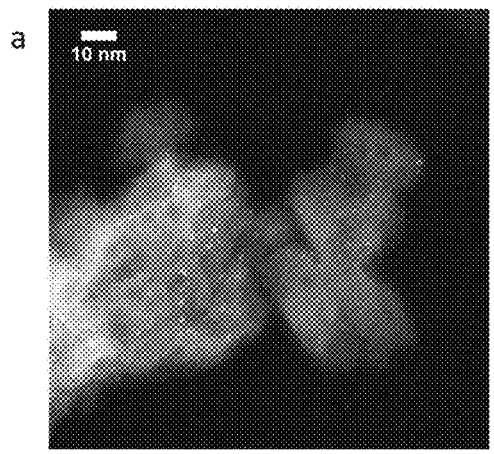
FIGS. 11A-11D show results for Pt on alumina materials.
Figure 11B:
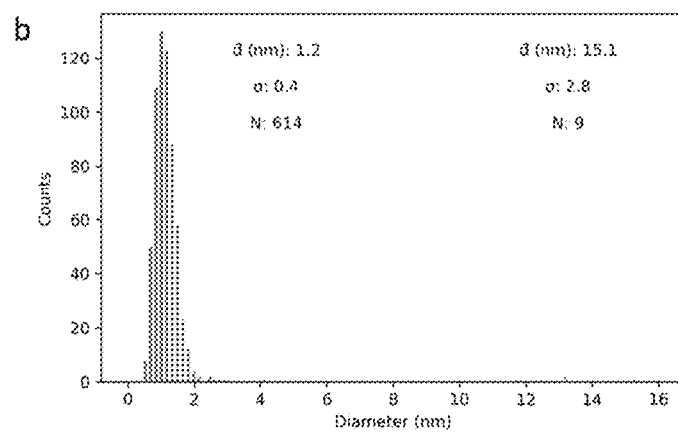
Figure 11C:
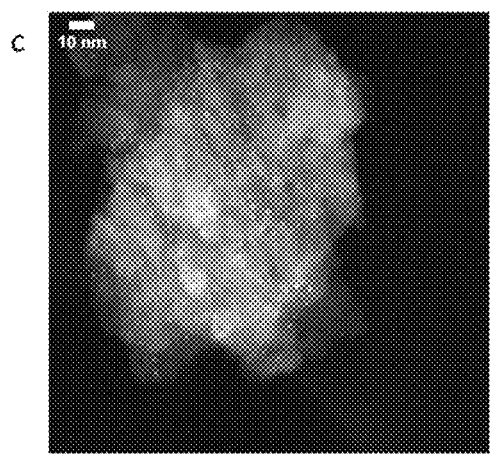
Figure 11D:
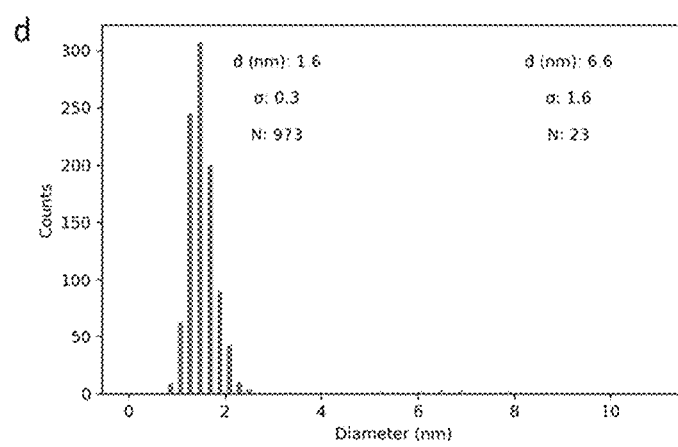

TEM images of Pt NPs on γ-Al$_2$O$_3$ (Table 6) reveal that the average particle size is 1.2±0.4 nm and after 18 h of PE hydrogenolysis is 1.6±0.4 nm. The Pt NP distribution can be described as bimodal, with sub-2 nm particles and >5 nm particles. The average Pt particle diameter for 5c-Pt/SrTiO$_3$ increased from 2.0±0.5 nm to 2.1±0.5 nm after 18 h (FIG. 1 and FIGS. 10A-10B). The negligible change in particle size of Pt in 5c-Pt/SrTiO$_3$ suggests that the stabilization of Pt by SrTiO$_3$ relative to γ-Al$_2$O$_3$ is effective in minimizing the effect of sintering under reaction conditions. Note that, platinum has a weaker interfacial interaction with γ-Al$_2$O$_3$ than with SrTiO$_3$ and the minimum energy Winterbottom shape of Pt on γ-Al$_2$O$_3$ is closer to that of a free Wulff particle, facilitating the sintering.

TABLE 6

Properties of 5c-Pt/SrTiO$_3$ and Pt/Al$_2$O$_3$ used in batch reactor experiments, initial and after 18 h in batch reactor.

| Entry | Pt loading[a] (wt %) | Average Pt size[b] (nm) | Average Pt edge (nm) to face (nm$^2$) ratio[c] | Average Pt surface area (m$^2$ Pt/g cat.)[d] |
|---|---|---|---|---|
| 5c-Pt/SrTiO$_3$ | 7.3 | 2.0 ± 0.5 | 0.159 | 15.1 |
| 5c-Pt/SrTiO$_3$ 18 h | 7.3 | 2.1 ± 0.5 | 0.151 | 14.4 |
| PVAl$_2$O$_3$ | 0.7 | 1.2 ± 0.4 | 0.306 | 1.7 |
| PVAl$_2$O$_3$ 18 h | 0.7 | 1.6 ± 0.4 | 0.228 | 1.3 |

[a]Determined by ICP-OES.
[b]Determined by TEM particle size analysis.
[c]Pt NPs approximated as Winterbottom constructions, with γPt{111}:γPt{100} = 0.84, Pt(100)||SrTiO$_3$(100) at 61% truncation, and Pt(100)||γ-Al$_2$O$_3$(111) at 16% truncation.
[d]Surface area calculated from Pt loading and average particle size, assuming the minimum energy Winterbottom construction.

Pt/Alumina.

Experiments were undertaken with controlled catalytic metal (Pt) particle sizes deposited on a non-porous substrate (alumina). The substrate was tested in both a spherical and flat form factor. The Pt/NanoDur performed similarly to the Pt/SrTiO$_3$, rapidly decreasing both the molecular weight and dispersity of the hydrocarbon chains, and unlike the Pt/Al$_2$O$_3$ (mesoporous gamma-alumina). This is likely a result of the porosity of the Pt/Al$_2$O$_3$ and the effect of diffusion of PE through the pores. However, the Pt/NanoDur had higher light gas production (more small carbon chain products) than Pt/SrTiO$_3$, likely a result of the higher edge:facet ratio of the Pt particles on alumina.

Figure 5A:
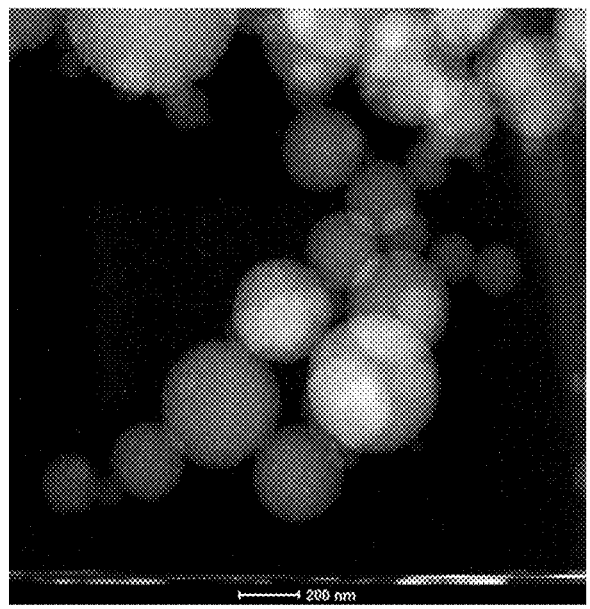
FIGS. 5A-5B show Pt NPs grown by atomic layer deposition (bright spots, 1-3 nm) distributed evenly on the surface of NanoDur alumina spheres (large spheres, 20-200 nm).
Figure 5B:
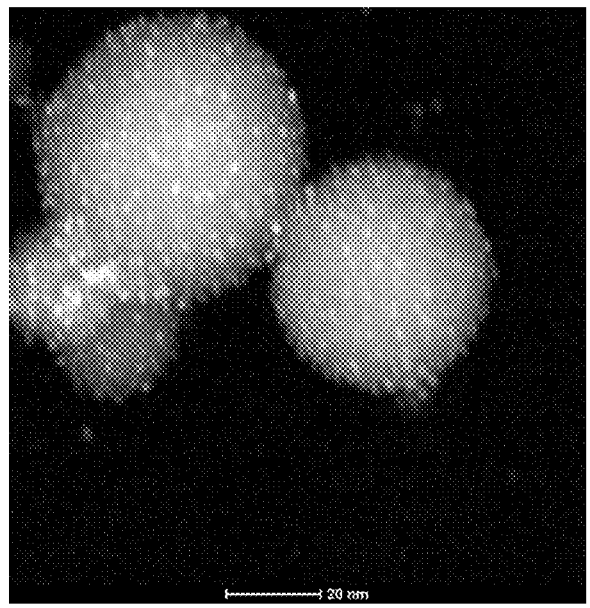
Figure 6A:
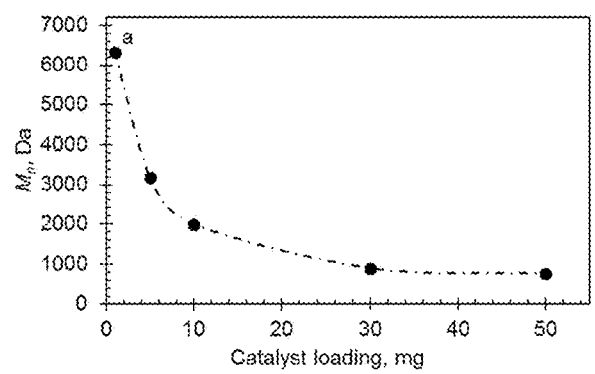
FIGS. 6A-6D show high-throughput hydrogenolysis of PE ($M_n$=8,150 Da) experiments using the screening pressure reactor ("SPR") over 5c-Pt/$SrTiO_3$.
Figure 6B:
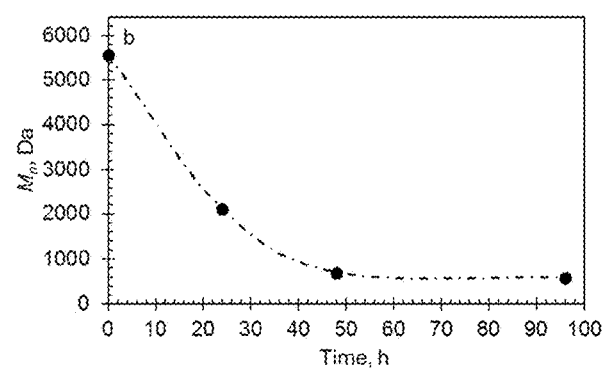
Figure 6C:
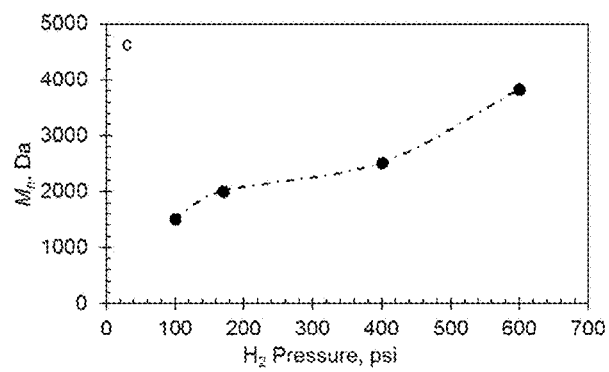
Figure 6D:
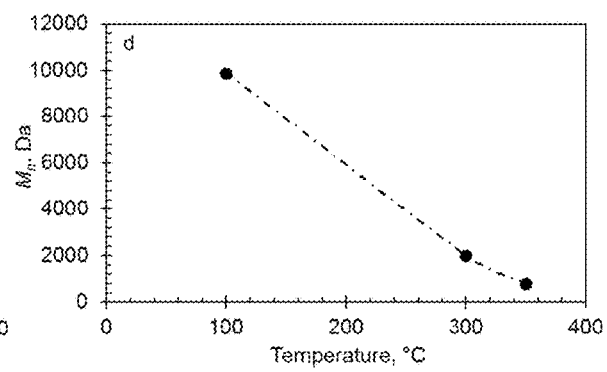

FIGS. 5A-5B show Pt NPs grown by atomic layer deposition (bright spots, 1-3 nm) distributed evenly on the surface of NanoDur alumina spheres (Fischer Scientific. 70:30% ratio of δ:γ-alumina phase, average particle size ~40 nm, S. A. 32-40 m$^2$/g, negligible porosity, large spheres, 20-200 nm).

TABLE 7

Pt/Alumina comparison. [0001] Reaction conditions: 170 psi H$_2$, 300° C., 48 h, and 50 mg PE, 10 mg Pt/Nanoduror Pt/Al$_2$O$_3$.

| Entry | M$_n$ (Da) | M$_w$ (Da) | Đ | Yield* (%) |
|---|---|---|---|---|
| PE | 8,150 | 22,150 | 2.7 | n/a |
| Thermal | 7,350 | 23,450 | 3.2 | >99 |
| Pt/Al$_2$O$_3$ | 4,138 | 13,897 | 3.4 | >99 |
| 1c-Pt/NanoDur | 535 | 779 | 1.5 | 80 |
| PE | 15,400 | 17,200 | 1.1 | n/a |
| Thermal | 18,450 | 19,450 | 1.1 | >99 |
| Pt/Al$_2$O$_3$ | 6,392 | 13,380 | 2.1 | >99 |
| 1c-Pt/NanoDur | 521 | 754 | 1.5 | 83 |
| PE | 158,000 | 420,000 | 2.7 | n/a |
| Thermal | 153,610 | 314,000 | 2.1 | >99 |
| Pt/Al$_2$O$_3$ | 7,399 | 9,922 | 1.3 | >99 |
| 1c-Pt/NanoDur | 616 | 1,120 | 1.8 | >99 |

*Yield is defined as the mass of the weight of hydrocarbons recovered relative to the initial mass of PE. Owing to the high viscosity of the melt polymer, mass transfer effects cannot be ruled out completely.

TABLE 8

Conversion of plastic bag by Pt/NanoDur. Reaction Conditions: 300 psi, 300° C., 20 mg of Plastic Bag, 10 mg of Pt/nanodur, 300 rpm, 48 hr.

| Entry | M$_n$ (Da) | M$_w$ (Da) | Đ | Yield |
|---|---|---|---|---|
| Plastic Bag | 33,000 | 115,150 | 3.5 | n/a |
| Thermal | 38,783 | 114791 | 3 | 106 |
| Pt/Nanodur | 1347 | 2217 | 1.7 | 95 |

As see in Table 7 and in the results of Table 8, a catalyst with Pt on alumina performs critically better than mere thermal treatment. The Pt/NanoDur, which has negligible porosity, has significantly higher performance than the mesoporous Pt/gamma-alumina. FIGS. 5A-5B show Pt NPs grown by ALD (bright spots, 1-3 nm) distributed evenly on the surface of NanoDur alumina spheres (large spheres, 20-200 nm). Note, for alumina spheres with Pt on mesoporous gamma-alumina, the performance can be similar to the thermal treatment (Table 7).

Definitions.

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:
1. A catalyst comprising:
   a $SrTiO_3$ substrate;
   a plurality of metal nanoparticles disposed on the substrate; and
   the plurality of metal nanoparticles having a diameter of 1 to 3 nm and a ratio of facets to edges of less than 0.286.
2. The catalyst of claim 1, wherein the plurality of nanoparticles comprise Pt.
3. The catalyst of claim 1, wherein the substrate comprises a perovskite having the formula of $ABO_{3-x}$ where x is in the range $0 \leq x \leq 0.5$ and A is an alkaline or rare earth element and B is a 3d, 4d, or 5d transition metal element.
4. The catalyst of claim 3 wherein the substrate comprises alumina platelets or alumina spheres.
5. The catalyst of claim 1, wherein the substrate is porous.
6. The catalyst of claim 1, wherein the substrate is non-porous.
7. The catalyst of claim 2, wherein the plurality of nanoparticles are a plurality of ordered nanoparticles.

\* \* \* \* \*